A. B. CORNELL.
SIGNAL FOR BALING PRESSES.
APPLICATION FILED DEC. 9, 1912.
1,069,602.
Patented Aug. 5, 1913.
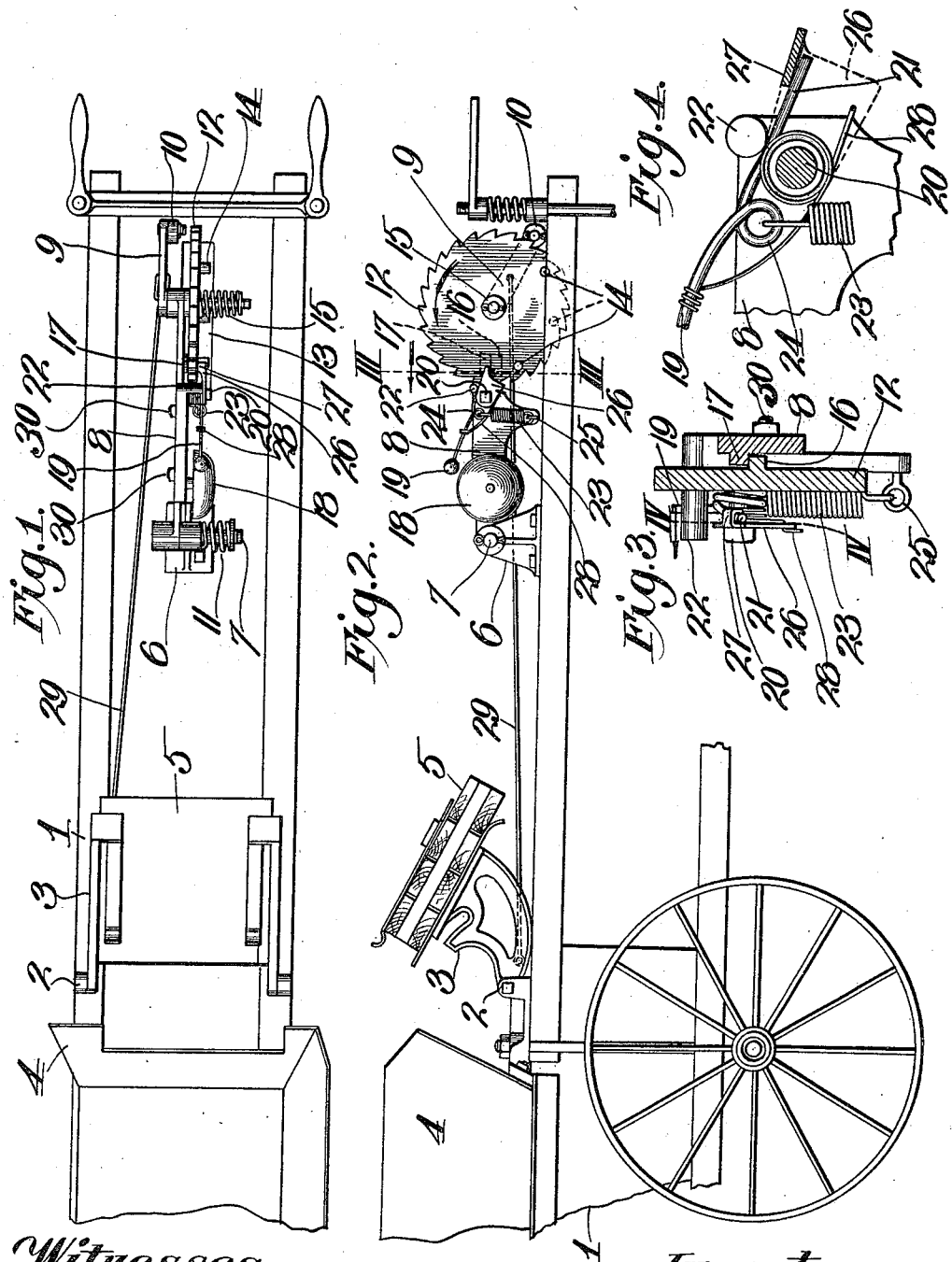
Witnesses
Frank R Glow
H.C. Rodgers.
Inventor
A.B. Cornell
By George H Loyd Atty

UNITED STATES PATENT OFFICE.

ARTHUR B. CORNELL, OF OTTAWA TOWNSHIP, FRANKLIN COUNTY, KANSAS.

SIGNAL FOR BALING-PRESSES.

1,069,602.     Specification of Letters Patent.     Patented Aug. 5, 1913.

Application filed December 9, 1912. Serial No. 735,712.

*To all whom it may concern:*

Be it known that I, ARTHUR B. CORNELL, a citizen of the United States, residing in Ottawa township, in the county of Franklin and State of Kansas, have invented certain new and useful Improvements in Signals for Baling-Presses, of which the following is a specification.

This invention relates to signals for baling presses, and has for its object to produce a signal which shall invariably operate when a bale has attained a predetermined length, viz., a size not too large to be encompassed by a standard bale tie.

With this general object in view, the invention consists in certain novel and peculiar features of construction and organization as hereinafter described and claimed; and in order that it may be fully understood, reference is to be had to the accompanying drawing, in which—

Figure 1, is a top plan view of a part of a baling press equipped with a signal embodying my invention. Fig. 2, is a side view of the same. Fig. 3, is an enlarged vertical section on the line III—III of Fig. 2. Fig. 4, is a section on the line IV—IV of Fig. 3.

In the said drawings, 1 is the baling case of a baling press of any suitable type, and pivoted thereto at 2, is a holder 3, to be swung into the hopper 4, to effect the insertion of a division block 5, in the baling case, the holder being swung back to its initial position as shown, after the block has been properly placed, as customary. Secured to the top of the case is a bracket 6, and pivoted to the same at 7, is one end of a toggle, consisting of a link 8, and a link 9, the rear or free end of the latter being preferably equipped with an antifriction roller 10, to travel back and forth on the case with the minimum friction. A spring 11 is secured at one end to bracket 6 and at its opposite end to the pivot 7 rigid with toggle link 8, for the purpose of holding the roller 10 upon the baling case with considerable pressure, and journaled on the toggle at the pivotal point of connection of its links, is a toothed wheel 12, which normally depends through a slot 13 in the baling case and engages a bale, not shown, in such case. The wheel 12 is provided with a plurality of laterally projecting pins 14, for a purpose which hereinafter appears, and a spring 15 is employed to resist the turning movement imparted to the wheel by the bale and to return the wheel to its initial position when withdrawn from engagement with the bale, as hereinafter explained, and to guard against excessive rotation of the wheel either forward or backward, it is provided with a stop 16, for alternately engaging the under and upper sides of a stop 17, projecting from the link 8 of the toggle.

18 is a gong carried by link 8 and 19 a spring clapper mounted on a bolt 20 secured to said link and provided with an arm 21 underlying a boss 22 whereby a spring 23 is prevented from holding the clapper in constant engagement with the gong, said spring 23 being secured at its upper end to a loop 24, in the clapper, and at its lower end to an eye 25, projecting from link 8.

26 is a trigger pivoted on bolt 20, and provided with an inwardly projecting arm 27, resting on the adjacent arm 21, of the clapper as shown in Fig. 4, and in the path of the pins 14 of the wheel, and to quickly return this trigger to normal position after it is raised or lowered by the pins 14, in passing, a spring 28 is secured at one end to the trigger and at the other end to a suitable point, preferably to the clapper.

29 is a rod connecting the holder and arm 9 of the toggle so that movement of the holder into the hopper shall contract the toggle and raise the wheel 12 from the bale and opposite movement of the holder shall reëxpand the toggle and assist spring 11 in restoring the said wheel to operative position.

To accommodate the forming of bales of different lengths, it will of course be necessary to equip the device with a proportionately larger or smaller wheel, and in this event it is desirable that the link 8 shall be extensible. The said link therefore consists of two members or plates adjustably secured together by bolts 30.

As the formation of a bale is started, the stop 16 is in engagement with the underside of the fixed stop 17, and it will be seen that the bale in its formation and movement, will impart rotation to the wheel in the direction indicated by the arrow thereon, see Fig. 2, and that sometime before the wheel has completed a revolution, the first pin 14 will depress and release the trigger 26, and thereby raise the hammer end of the clapper, against the resistance of spring 23, so that the latter will cause said end to strike the gong as the trigger is released by said pin and thus signal the attendant. Shortly afterward this signal is repeated through the instrumentality of the second pin and upon the operation of the signal by the third or last pin, the attendant is made aware that the bale has attained the proper length and that it is time to insert the division block, it being noted that at such time the stop 16 is engaging the upper side of the fixed stop 17. In swinging the holder into the hopper to insert the block, the rod 29 is pulled forward and exerts corresponding force on the link 9, of the toggle, and causes the roller 10 thereof to roll upon the top of the case and thus raise the joint of the toggle links until the wheel 12 is totally withdrawn from the bale. As this object is accomplished, the spring 15, which was placed under tension by the rotatable movement imparted to the wheel by the bale, is left free to rotate wheel 12 back to its original position, that is until the stop 16 strikes the underside of the stop 17, and thus arrests the back rotation of the wheel. It will thus be seen that the wheel will invariably rotate a predetermined distance before it sounds the final signal and that consequently the bales will always be, of what may be called, a predetermined size, that is a size which can be readily encompassed by standard bale ties, not shown.

The desirability of a signal for calling attention to the fact that it is time to insert a division block in the baling case is recognized, but heretofore, so far as my knowledge extends, the wheel driven by the advancing bale frequently overruns if not closely watched, and as a result it is necessary to frequently rebale large volumes of material because, if the wheel overruns materially on any particular bale, the latter cannot be encompassed by the bale tie wires. Furthermore where the wheel overruns the length of the bales cannot be accurately gaged without close watching on the part of the attendant. With my signal mechanism, the wheel stops when the bale has attained its maximum length, which condition the attendant will soon perceive and remedy by operating the division block holder. While this signal mechanism does not prevent a very careless attendant from wasting time and labor, it does insure that each bale shall start when the movable stop on wheel 12 is in engagement with the underside of the fixed stop 17 of the toggle, and also invariably signals the attendant when the bale has attained a predetermined length, which of course is not true of any signal mechanism actuated by a wheel capable of overrunning.

From the above description it will be apparent that I have produced a signal for baling presses embodying the features of advantage enumerated as desirable and I wish it to be understood that while I have illustrated and described the preferred embodiment of the same, I reserve the right to make all changes properly falling within the spirit and scope of the appended claims.

I claim:—

1. The combination with a baling press, of a toggle, a wheel carried by the toggle and projecting into the case for engagement with a bale being formed therein when the toggle is expanded, signal means operated by the wheel in rotation imparted to it by the bale, and means for contracting the toggle and thereby disengaging the wheel from the bale.

2. The combination with a baling press, of a toggle, a wheel carried by the toggle and projecting into the case for engagement with a bale being formed therein when the toggle is expanded, signal means operated by the wheel in rotation imparted to it by the bale, means for contracting the toggle and thereby disengaging the wheel from the bale, and means for rotating the wheel back to its initial position when the same is disengaged from the bale.

3. The combination with a baling press, of a toggle, a wheel carried by the toggle and projecting into the case for engagement with a bale being formed therein when the toggle is expanded, signal means operated by the wheel in rotation imparted to it by the bale, means for contracting the toggle and thereby disengaging the wheel from the bale, and a spring for rotating the wheel back to its initial position when the same is disengaged from the bale.

4. The combination with a baling press, of a toggle, a wheel carried by the toggle and projecting into the case for engagement with a bale being formed therein when the toggle is expanded, signal means operated by the wheel in rotation imparted to it by the bale, a pair of stops, one of them fixed and the other rotatable with the wheel and adapted to engage the fixed stop when the wheel is turned a predetermined distance, and means when the wheel is disengaged from the bale, to turn the wheel backward until arrested by the engagement of the rotatable stop with the opposite side of the fixed stop.

5. The combination with a baling press, of a toggle, a wheel carried by the toggle and projecting into the case for engagement with a bale being formed therein when the toggle is expanded, signal means operated by the wheel in rotation imparted to it by the bale, a movable division block holder, and means whereby the operation of the holder in one direction shall effect the disengagement of the wheel from the bale and the operation of the holder in the reverse direction shall effect the reëngagement of the wheel with the bale.

6. The combination with a baling press, of a wheel engaging the bale being formed in the press, a signal, means whereby a predetermined rotation of the wheel shall operate the signal, a movable division block holder, means whereby operation of said holder to effect the insertion of the block in the baling case shall effect the disengagement of the said wheel from the bale and the reverse operation of the said holder shall effect the reëngagement of the said wheel with the bale.

7. The combination with a baling press, of a toggle, a wheel carried by the toggle and projecting into the case for engagement with a bale being formed therein when the toggle is expanded, signal means operated by the wheel in rotation imparted to it by the bale, a movable division block holder, and a link connecting said block holder and said toggle whereby to contract the latter when the block holder is operated to effect the insertion of the block in the baling case, and to expand the toggle when the holder is moved back to its initial position.

8. The combination with a baling press, a wheel carried by the toggle and engaging a bale being formed in the baling case when the toggle is expanded, a pin projecting from said wheel, a gong, a clapper adjacent to the gong, a pivoted trigger adapted to be operated by the pin in passing, to raise the clapper and release it so that it shall strike the gong, a spring to reverse the rotation of the wheel when the same is disengaged with the bale, and means to arrest the reverse movement of the wheel when such movement equals that which was imparted to it by the bale.

9. A signal mechanism for baling presses, comprising a toggle, a wheel movable bodily by the toggle and normally adapted to be turned through movement of compressed material in the press, signal mechanism operated by the wheel in the movement thereof, and means for operating the toggle and throwing the wheel to inoperative position or to operative position.

10. A signal mechanism for baling presses, comprising a toggle, a wheel movable bodily by the toggle and normally adapted to be turned through movement of compressed material in the press, signal mechanism operated by the wheel in the movement thereof, and a division block holder connected to the toggle to operate the same.

In testimony whereof I affix my signature, in the presence of two witnesses.

ARTHUR B. CORNELL.

Witnesses:
E. A. BURTCH,
Mrs. JOHN L. HIGH.

Copies of this patent may be obtained for five cents each, by addressing the "Commissioner of Patents, Washington, D. C."